US010148059B2

(12) United States Patent
Podgorski

(10) Patent No.: US 10,148,059 B2
(45) Date of Patent: Dec. 4, 2018

(54) GAIN MIRROR FOR SOLID STATE RING LASER ROTATION SENSORS

(71) Applicant: Theodore John Podgorski, Oro Valley, AZ (US)

(72) Inventor: Theodore John Podgorski, Oro Valley, AZ (US)

( * ) Notice: Subject to any disclaimer, the term of this patent is extended or adjusted under 35 U.S.C. 154(b) by 0 days.

(21) Appl. No.: 15/626,106

(22) Filed: Jun. 17, 2017

(65) Prior Publication Data
US 2017/0373458 A1 Dec. 28, 2017

Related U.S. Application Data

(60) Provisional application No. 62/493,119, filed on Jun. 23, 2016.

(51) Int. Cl.
*H01S 3/083* (2006.01)
*H01S 3/06* (2006.01)
*H01S 3/08* (2006.01)
*G01C 19/66* (2006.01)
H01S 3/0941 (2006.01)
H01S 3/16 (2006.01)
H01S 3/17 (2006.01)

(52) U.S. Cl.
CPC ............ *H01S 3/083* (2013.01); *G01C 19/66* (2013.01); *H01S 3/0604* (2013.01); *H01S 3/08013* (2013.01); H01S 3/0809 (2013.01); H01S 3/0941 (2013.01); H01S 3/1611 (2013.01); H01S 3/176 (2013.01)

(58) Field of Classification Search
None
See application file for complete search history.

(56) References Cited

U.S. PATENT DOCUMENTS

| | | | |
|---|---|---|---|
| 2004/0202222 A1* | 10/2004 | Pocholle | G01C 19/66 372/75 |
| 2005/0040337 A1* | 2/2005 | Cox | G01N 21/05 250/343 |
| 2007/0274361 A1* | 11/2007 | Calvez | H01S 5/041 372/50.1 |
| 2008/0151961 A1* | 6/2008 | Kim | H01S 5/0425 372/94 |
| 2011/0064099 A1* | 3/2011 | Govorkov | H01S 5/0217 372/36 |
| 2014/0044226 A1* | 2/2014 | Campbell | G21B 1/23 376/103 |

* cited by examiner

*Primary Examiner* — Charlie Y Peng

(57) ABSTRACT

A gain mirror is created for use as an optical amplifier in a solid state ring laser rotation sensor. Such a ring laser includes at least three mirrors for reflecting counter propagating laser beams around a closed loop optical path, wherein at least one of the mirrors is a gain mirror. The gain mirror is formed by applying a thin film of silica, a few half wavelengths thick and doped with Nd isotopes, onto a very high reflectivity mirror and then using a laser diode to pump it with intense light to form a population inversion in $Nd^{3+}$ ions. An assembly consisting of this gain mirror and a pump laser diode can be used as an optical amplifier in a solid state ring laser to generate the two counter propagating laser light beams needed to measure rotation.

16 Claims, 4 Drawing Sheets

GAIN MIRROR FOR SOLID STATE RING LASER ROTATION SENSORS

CROSS-REFERENCE TO RELATED APPLICATIONS

This application claims priority to: Podgorski, Theodore John, Gain Mirror For Solid State Ring Laser Rotation Sensors, Provisional Patent Application No. 62/493,119, Filing Date Jun. 23, 2016, herein incorporated by reference.

BACKGROUND OF THE INVENTION

The field of this invention includes ring lasers used in laser gyros, which are typically used in system applications to measure rotation. The concept of using a ring laser to measure angular motion (rotation) was first publicly disclosed in the Feb. 11, 1963 Aviation Week and Space Technology magazine. Its operation was based on using a low pressure Helium-Neon gas discharge for the active gain medium for good technical reasons and ring laser gyros have been powered by an Helium-Neon gas discharge ever since. For more than 50 years no better method has been found. The physics of gas discharge and solid state lasers is now well understood (see, for example, Yariv, and Rabeendran) and gas discharge ring laser gyros are now used successfully in navigation, stabilization, surveying and many other systems. They work very well but have lifetime, reliability, performance and size limitations associated with the gas discharge and are expensive to manufacture. The gain mirror described below for use in a truly solid state ring laser will have a very positive impact on all these areas.

Klass, P. J., Ring Laser Device Performs Rate Gyro Angular Sensor Functions, Aviation Week and Space Technology Magazine, Feb. 11, 1963

Yariv, A., Introduction to Optical Electronics, 2nd Ed., New York, Holt, Rhinehart and Winston, 1976

Rabeendran, N., New Approaches to Gyroscopic Lasers, PhD Thesis, University of Canterbury, 2013

BRIEF SUMMARY OF THE INVENTION

A thin film gain mirror, which provides bidirectional optical amplification, is created for use in solid state ring laser rotation sensors. Such ring lasers include at least three very high reflectivity multilayer dielectric mirrors attached to an ultra stable block of material in such a way as to form a closed loop optical path. At least one of the mirrors serves, in part, as a gain mirror. When gain in the closed loop optical path exceeds loss, two counter propagating laser light beams travel around the path and can be used to measure rotation.

The gain mirror is constructed by first depositing a multilayer dielectric mirror unto an highly polished, ultra stable substrate and then depositing a single layer of Neodymium (Nd) doped silica ($SiO_2$) on top of the multilayer mirror. The mirror is tuned to the laser beam wavelength by making the thicknesses of the alternating layers of dielectric material equal to a quarter optical wavelength of the counter propagating laser light beams. Typical dielectric materials are Titanium dioxide ($TiO_2$) and Silicon dioxide ($SiO_2$) but other materials may be used. The thickness of the Nd doped thin film silica gain layer is made an integer number of half optical wavelengths of the laser light beams in order to maximize the laser light intensity inside the gain layer for maximum gain. $Nd^{3+}$ ions in the silica host top layer are responsible for optical amplification.

However, because the Nd gain curve in silica is inhomogeneously broadened an appropriate ratio of Nd isotopes must be present in the gain layer in order to eliminate the gain competition which would occur if a single isotope were used. This competition would extinguish one of the counter propagating laser light beams making rotation sensing impossible. The ratio of Nd isotopes can be adjusted during the gain mirror fabrication process.

An intense pump laser diode light source is used to illuminate the gain layer and create a population inversion in the $Nd^{3+}$ ions. It is easiest to pump the gain layer with light of wavelength 0.8 microns and create counter propagating laser beams of wavelength 1.06 microns because this is a four level laser system. However, it is possible to create laser beams having alternative frequencies by using different host materials and dopants in the gain layer, pumping with light of different wavelength and adjusting the multilayer mirror film thicknesses.

It is an object of the present invention to replace the electrically excited gas discharge optical amplifier element in a ring laser with a laser diode pumped gain mirror, comprised of a thin film of Neodymium (Nd) doped silica ($SiO_2$) deposited onto one of the ring laser mirrors, to form an all solid state ring laser.

It is a further object of the present invention to improve the lifetime, reliability and performance of ring laser rotation sensors by eliminating the negative effects associated with a gas discharge.

Lastly, it is object of the present invention to provide a ring laser with fewer parts and a very simple and easy to construct design.

BRIEF DESCRIPTION OF THE DRAWINGS

Four drawings help explain how a gain mirror is used in a ring laser rotation sensor. The advantages of the solid state ring laser over the conventional gas discharge ring laser are very apparent in these figures.

DETAILED DESCRIPTION OF THE INVENTION

Figure 1:
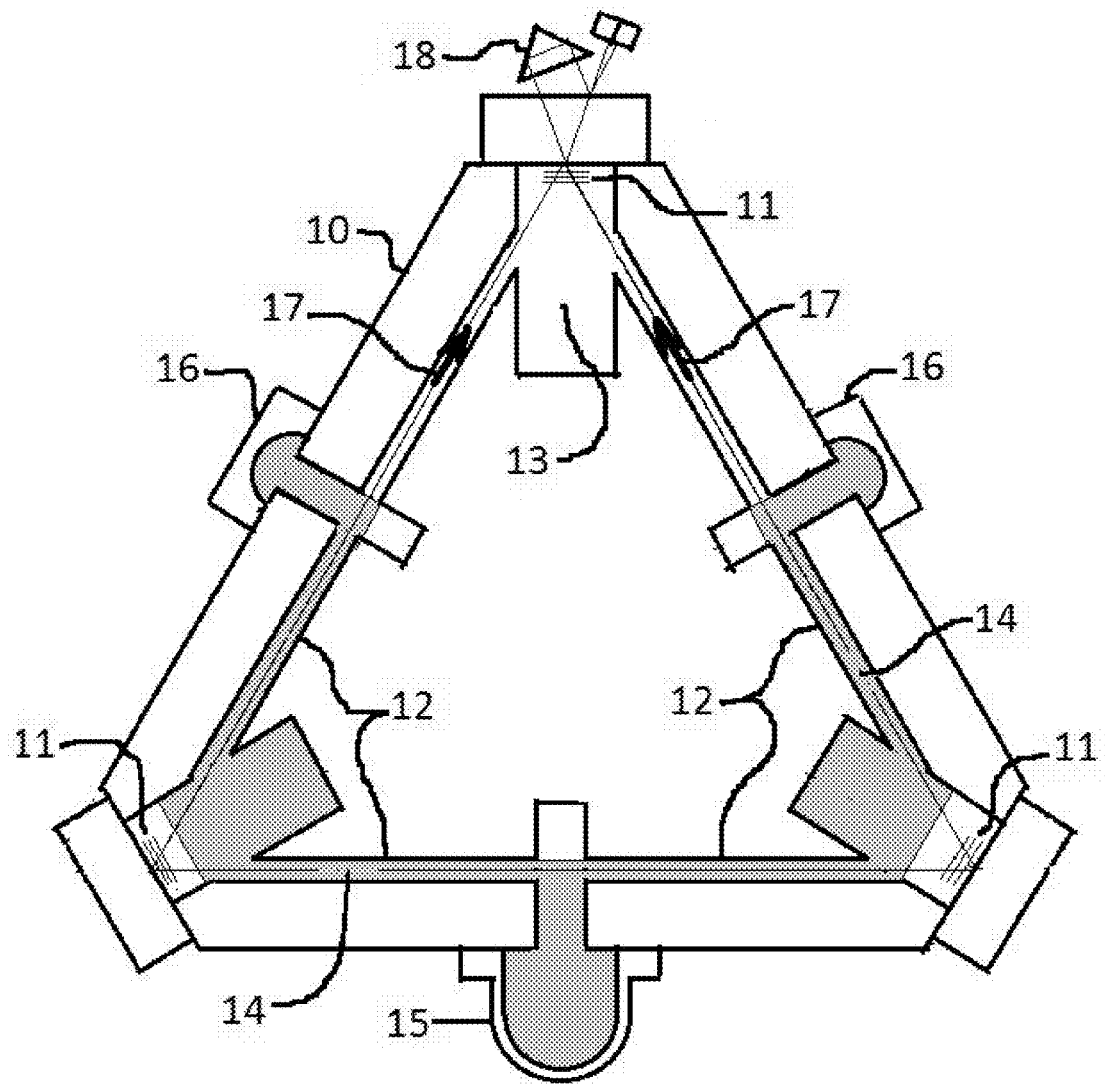
FIG. 1 shows the key elements of a gas discharge ring laser. It shows the machined and polished block with three multilayer dielectric mirrors and a cathode and two anodes attached thereto, the gain tubes filled with Helium and Neon gases, the balanced gas discharges and the readout optics.

A conventional gas discharge ring laser shown in FIG. 1 is formed by attaching three high reflectivity multilayer dielectric mirrors 11 onto an ultra stable, low coefficient of expansion glass-ceramic body 10 which has appropriate cavities machined into it which behave as gain tubes 12 when filled with Helium-Neon gases 13 at low pressure and excited by an high-voltage, low-current electrical discharge 14 between a cathode 15 and a pair of anodes 16. When the discharge is excited, laser light is generated in the triangular optical cavity defined by the three mirrors 11. Two counter propagating beams of light 17 travel around the optical cavity through the gain tubes. When the laser body is stationary in inertial space the two beams of light have identical frequencies, but when the body rotates the beams of light differ in frequency. This frequency difference can be measured by extracting minuscule amounts of light from each beam and overlaying them onto a pair of optical detectors using a simple prism and beam splitter arrangement 18 to form an optical fringe pattern. The rate of fringe motion (a beat frequency) across the detector pair is proportional to the rate of rotation and the direction the fringes move gives the direction of rotation.

Figure 2:
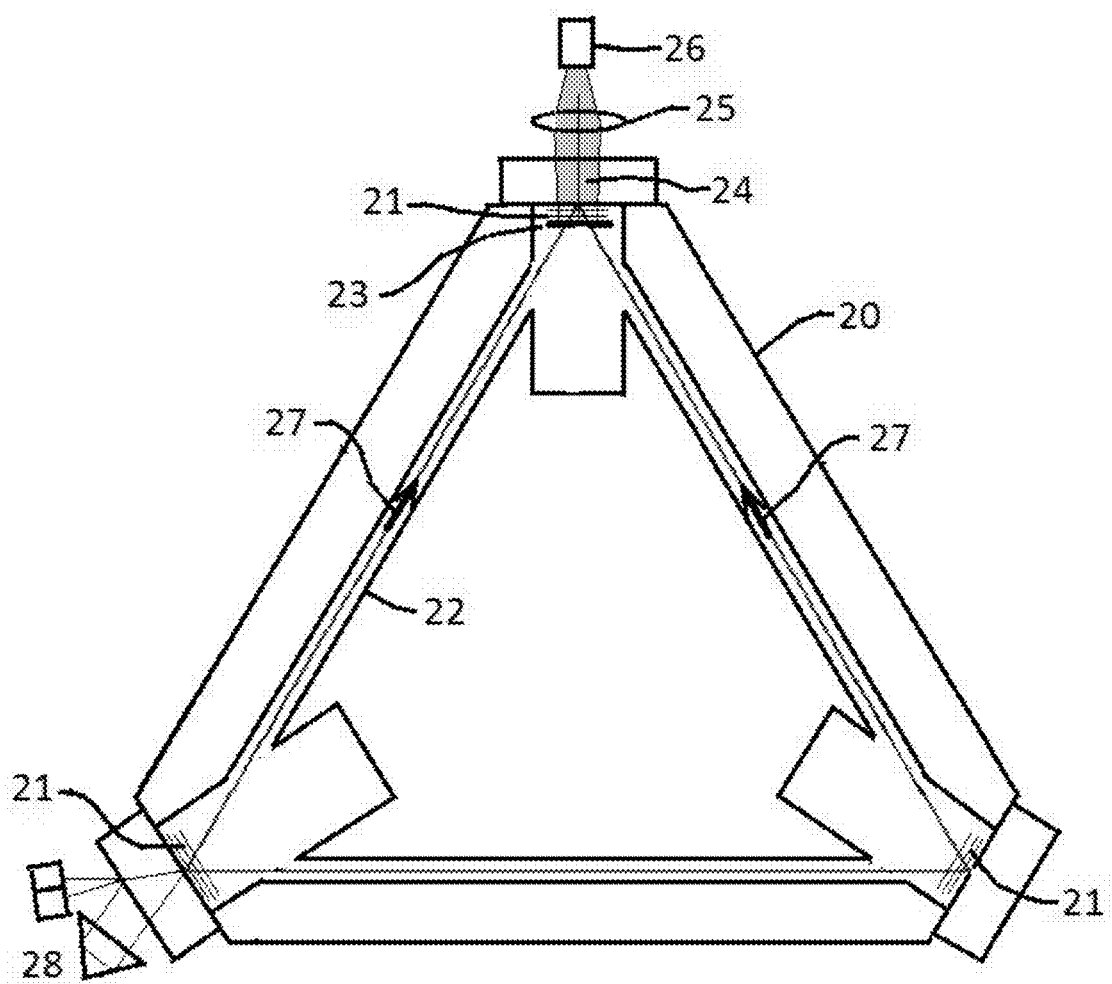
FIG. 2 shows the much simpler solid state ring laser assembly where the gas discharge and electrodes have been replaced by a thin film of Nd doped silica deposited onto one of the multilayer dielectric mirrors and a laser diode illuminating and pumping the doped thin film through a focusing lens.

The solid state ring laser shown in FIG. 2 is comprised of three high reflectivity multilayer dielectric mirrors 21 mounted onto an ultrastable, machined and polished block of material 20. These mirrors are positioned to define a closed loop optical path (the optical cavity), which passes through holes 22 in the block, and is traversed by counter propagating laser beams 27 when gain in the optical cavity exceeds loss. The frequencies of these laser beams are sensitive to rotation and the difference in the laser beam frequencies, which is proportional to rotation, is measured using a simple beam combining optical system and detector 28 just as in the conventional gas discharge ring laser.

The solid state ring laser shown in FIG. 2 has no electrically excited gas discharge but has a thin, amorphous film 23 of Neodymium (Nd) doped silica ($SiO_2$) deposited on top of one or more of its multilayer dielectric mirrors 21 creating a gain mirror to supply optical amplification. Light supplied by a 0.8 micron wavelength pump laser diode 26 and lens 25 assembly provides the light excitation energy 24 necessary to create the population inversion in $Nd^{3+}$ ions in the Nd doped thin film which is needed for lasing action 27 to occur at 1.06 micron wavelength in the optical cavity. This is a very simple design. The laser diode pumped Nd doped thin film 23 is the optical amplifier in the solid state ring laser and is the crux of this invention.

Nd doped silica is an extremely high-gain medium at 1.06 microns wavelength and only needs to be a few wavelengths thick in order for lasing action to occur. The solid state gain medium must be very thin so as not to introduce errors into the rotation measurement process. This high gain together with the ultra low loss optical cavity of the ring laser is the absolutely ideal combination.

There are laser diodes that are very efficient emitters at the 0.8 micron wavelength needed to pump the $Nd^{3+}$ ions in the doped Nd thin film and create the population inversion necessary to support laser oscillation at 1.06 microns wavelength and the thin film is very absorptive at 0.8 micron. Diodes that emit many milliwatts of power at 0.8 micron are readily available and are capable of operating the ring laser significantly above the threshold needed to achieve useful power output in the microwatt range.

The use of the gain mirror as described herein is uniquely applicable to high performance ring lasers whose optical cavities have ultra low loss. Nd doped silica has extremely high gain per unit length but has very small total gain in thin film form where the laser beam impinges on and passes through the face of the film, but this gain is still more than enough to create lasing action in an ultra low loss cavity.

In order to demonstrate the viability of the thin film gain mirror we can calculate a gain coefficient. Following A. Yariv we can find the approximate value for the gain coefficient in Nd doped silica ($SiO_2$) containing an inverted population of $Nd^{3+}$ ions. According to Yariv, the gain coefficient is given by the equation:

$\gamma = (N_2 - N_1)\lambda^2 g(v)/8\pi n^2 t_{spont}$ where $\gamma$ is the fractional gain per cm Also
 $(N_2 - N_1)$=the population inversion density of the $Nd^{3+}$ ions in number per $cm^3$.
 $\lambda$=the lasing wavelength in cm.
 $g(v)=1/(\Delta v)$ is the gain curve line shape function with $\Delta v$ the linewidth in hertz.
 $n$=the index of refraction for Nd doped $SiO_2$.
 $t_{spont}$=the spontaneous emission lifetime of the level 2 to level 1 transition in seconds.

Nd doped silica typically contains about $5 \times 10^{20}$ Nd atoms/$cm^3$. For an easy to achieve 3% population inversion this gives $(N_2-N_1)=0.03 \times 5 \times 10^{20}=1.5 \times 10^{19}/cm^3$.

Using the following data for Nd in silica
 $\lambda$=1.06 micron=$1.06 \times 10^{-4}$ cm
 n=1.5
 $\Delta v = 6 \times 10^{12}$ sec
 $t_{spont}=3 \times 10^{-4}$ sec
we get a gain coefficient $\gamma = 1.5$ $cm^{-1}$
For a 3 wavelength thick (3 micron=$3 \times 10^{-4}$ cm) thin film the total gain per pass is G=$1.5 \times 3 \times 10^{-4}$=$4.5 \times 10^{-4}$=450 ppm.

Typical high performance ring lasers have round trip optical cavity losses in the range of 100 to 200 ppm so this is a very favorable gain-to-loss ratio and assures laser oscillation will take place when using the gain mirror. Note that each laser beam traverses the Nd doped thin film gain media twice in a round trip pass of the optical cavity but because there are two lasers present (counter propagating beams) this analysis is valid.

Also note that high gain alone is not sufficient to assure the existence of counter propagating laser beams in the optical cavity. In the gas discharge Helium-Neon ring laser FIG. 1 the use of an (approximate) 1:1 ratio of the $Ne^{20}$ and $Ne^{22}$ isotopes is necessary to eliminate the gain competition at the center of the composite gain curve that occurs if a single isotope or even naturally occurring Ne were used (reference, the Lamb dip). This gain competition will extinguish one of the beams making rotation sensing impossible. Like the Ne gain curve, the Nd gain curve in silica is inhomogeneously broadened and the use of a single isotope of Nd would cause the same problem. Fortunately, the multiple Nd isotopes occurring naturally can be used to eliminate this problem. If needed, the Nd isotope concentrations in the silica sputtered or evaporated to form the gain film can be adjusted to get the required gain film concentration.

Amorphous Nd doped silica must be used in order to eliminate the high internal scattering that polycrystalline materials have which leads to a high lock-in threshold that reduces measurement accuracy of the laser gyro.

Figure 3:
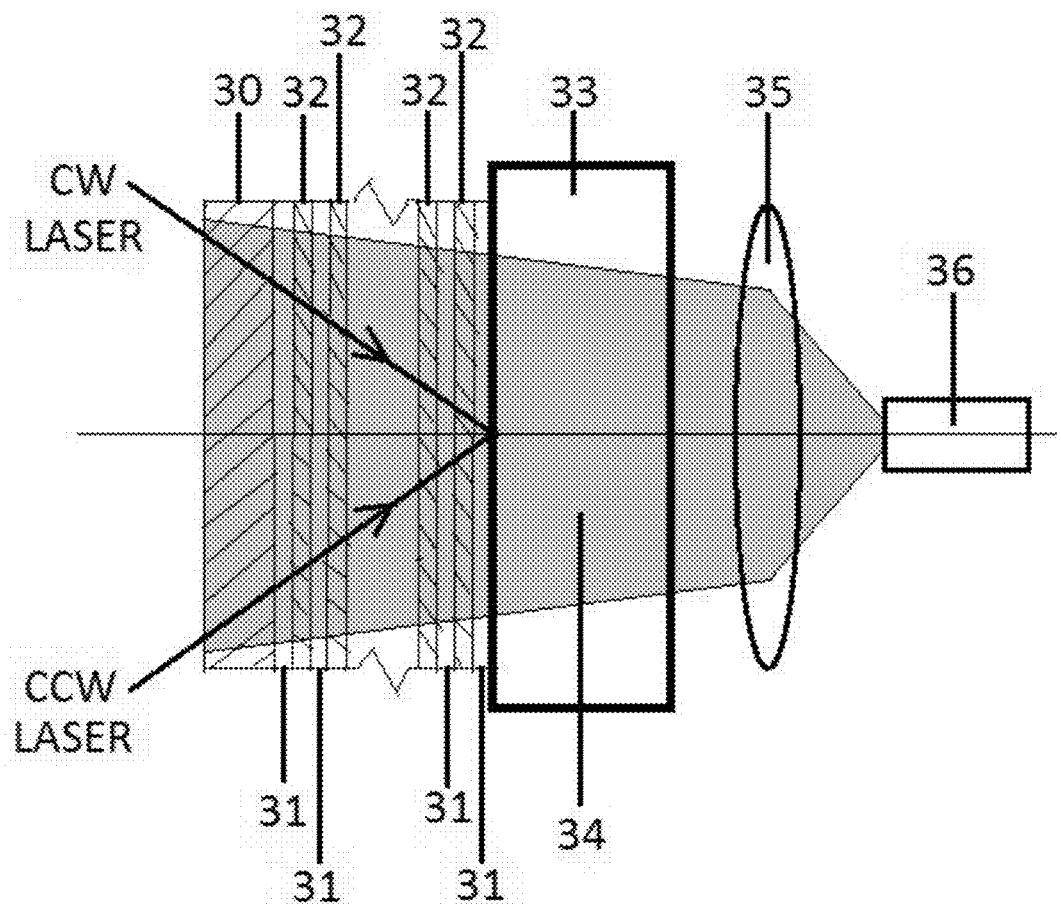
FIG. 3 is a view of a gain mirror assembly showing a laser diode and lens pumping a thin film of Nd doped silica on top of a high reflectivity multilayer dielectric mirror.

One design for the gain mirror is shown in FIG. 3. Here a thin film of Nd doped silica 30 is deposited onto the outer layer 31 of a multilayer dielectric mirror. High reflectivity multilayer dielectric mirrors are formed by depositing alternate layers of high 31 and low 32 index of refraction material, each a quarter optical wavelength thick, onto a highly polished substrate 33. Typical materials are $TiO_2$ and $SiO_2$. The gain medium would preferably be deposited as an outer layer 30 which would be an integer number of half optical wavelengths thick so it would have no effect on passive mirror reflectivity and beam intensity would be maximum inside the gain material.

It would also be possible to replace one or more or all of the inner SiO$_2$ layers 32 of the mirror with Nd doped silica that is an odd number of quarter optical wavelengths thick. This is not as efficient a design because the laser beam intensity falls off rapidly inside the mirror stack and some pump light is uselessly absorbed.

The pump light 34 can be delivered to the Nd doped thin film of the gain mirror in several ways. One way is shown in FIG. 2 (and FIG. 3) where the laser diode 26 (and 36) and simple focusing optics 25 (and 35) are located inside the solid state ring laser housing. This is simple enough but places an undesirable heat source inside the housing and makes it difficult to replace the diode when needed.

Figure 4:
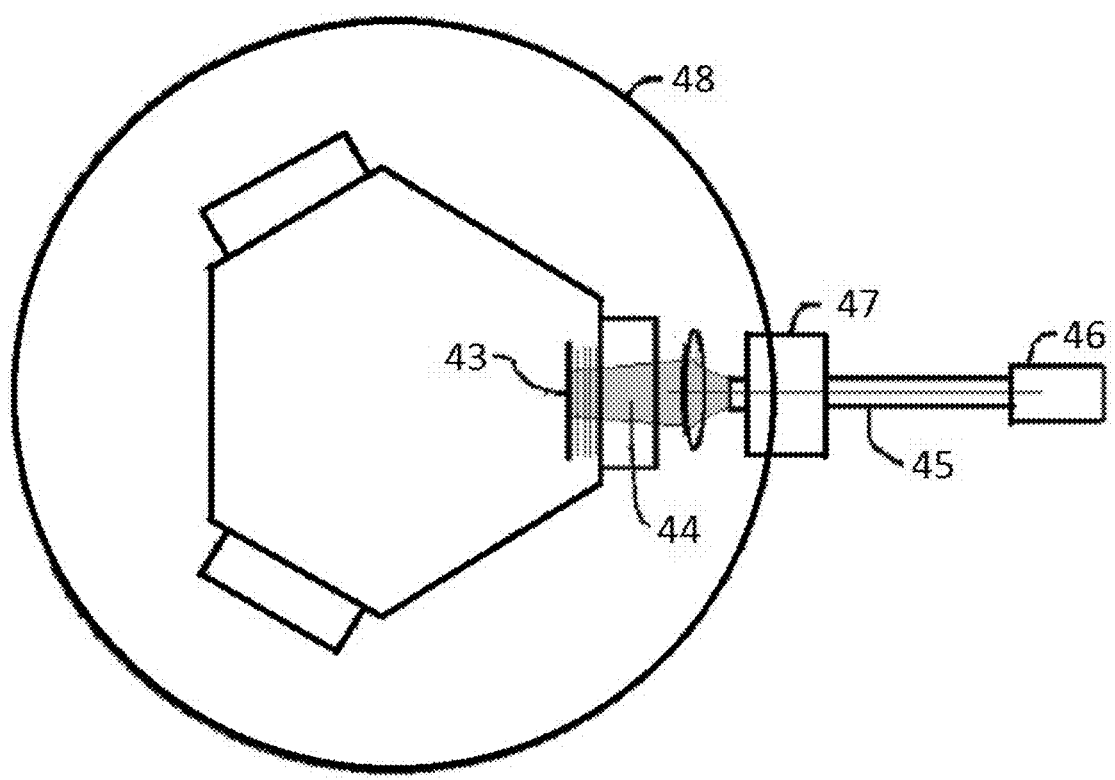
FIG. 4 shows an alternate way of delivering the pump light to the Nd doped thin film gain layer from a laser diode, located outside the laser housing, by using a fiber optic cable and connector.

Another approach shown in FIG. 4 is to locate the laser diode 46 outside the housing 48 and transmit the pump light 44 from the diode to the gain mirror 43 via a fiber optic cable 45. A connector 47 can be used to pass the light through the housing wall 48. This removes the diode and control electronics heat sources from inside the housing and makes the diode easily replaceable.

Lasing operation with a Nd doped thin film SiO$_2$ gain mirror at 1.06 micron wavelength pumped by a laser diode at 0.8 micron wavelength is the easiest to achieve because this is a four level laser system. However, other laser operating wavelengths are possible by adjusting the multi-layer dielectric mirror film thicknesses and changing the dopant material to change energy levels and adjusting the pump diode wavelength. For example, it may be desireable to have a laser operating closer to the visible portion of the optical spectrum where detectors are more sensitive.

A low pressure gas is a near ideal optical transmission medium. However, the low pressure Helium-Neon discharge is a source of measurement error in the gas discharge ring laser gyro and limits the lifetime and reliability of the sensor. It also adds to high manufacturing costs. As seen below, the solid state ring laser offers dramatically lower costs, increased reliability and lifetime, and enhanced performance.

The manufacturing benefits of the solid state ring laser can be seen by comparing FIG. 1 and FIG. 2. Here we see that the basic laser block is simplified by eliminating the electrodes and machined passages from the electrodes to the gain tubes. Also the polishing operations needed to form the surfaces needed to seal the electrodes to the block are eliminated. The expensive cathode made from exotic long-life material and an anode and anode fill tube are also eliminated.

The gain tubes are no longer needed so the accuracy of this machining operation and its cost can also be reduced. These holes simply need to be passages for the counter propagating laser beams.

The glass-ceramic material presently used for the ring laser body is no longer needed because without the need for Helium gas there is no concern over Helium gas loss through permeation through the material affecting lifetime. It could be replaced with ultra low expansion (ULE) fused silica, for example. This material is amorphous and has the potential for easier, quicker optical contact assembly of the mirrors to the block because glassy surfaces form better optical contact bonds than the polycrystalline surfaces of glass-ceramics, reducing assembly costs.

The mirror substrates could also be made from amorphous ULE fused silica and may lead to reduced polishing costs, higher quality mirror substrates and enhanced optical contact seals.

The solid state ring laser is significantly easier to assemble. Once the electrodes are bonded to the gas discharge ring laser block and the mirrors optically contacted to the block, the assembly must be attached to a highly specialized processing station. Here atmospheric gases must be vacuumed out and replaced with a low pressure mixture of special Helium and Neon isotopes. Before these gases are added, however, the cathode must be Oxygen processed to form a long-life electron emission surface. After the cathode is processed the Helium-Neon gas mixture is added and the laser must undergo a burn-in and clean-up procedure.

All this processing takes time and requires complex, expensive, high maintenance vacuum and filling equipment. With the solid state ring laser all this processing and equipment is eliminated. It is replaced by a simple vacuum station that is only needed to evacuate the atmospheric gases. This is a substantial reduction in cost and should enhance manufacturing throughput.

The elimination of expensive isotopes of Helium and Neon is also a substantial cost savings.

The solid state ring laser makes it possible to simplify the electronics required for operation. The gas discharge requires complex start and run electronics. In order to start the gas discharge a very high, short duration voltage must be applied. After the discharge starts a high voltage must still be maintained between the cathode and anodes to keep the discharge running. The discharge must have symmetry to reduce gas flow induced measurement errors and thus the discharge control circuits must not only control the total current but the current balance between the two legs of the discharge. These high voltage circuits are problematic in the low voltage environment associated with modern digital circuitry.

The solid state ring laser has no need for these high voltages and these circuits can be eliminated with significant cost savings. High voltage current control is replaced by low voltage control of the laser diode which may be outside the sensor housing.

The solid state ring laser offers increased lifetime and reliability. The gas discharge is the main source of failures in the gas discharge ring laser assembly. The ultraviolet radiation and charged particles in the gas discharge degrade the mirror coating materials and increase mirror absorption leading to laser failure. The process that sustains the gas discharge involves ion bombardment of the cathode to release free electrons. This ion bombardment slowly buries gas molecules in the surface of the cathode and material sputtered off the cathode surface buries gas molecules on the walls of the discharge tubes. Both processes reduce Helium and Neon gas pressure in the laser, reduce gain and eventually lead to failure of the ring laser.

These processes don't exist in the solid ring laser and the lifetime will be determined by the life of the pump laser diode which can be in excess of 100,000 hours. If the pump light is supplied to the gain mirror by an external laser diode connected to the solid state ring laser by a fiber optic cable, it can easily be replaced when its lifetime is up.

The solid state ring laser offers enhanced performance. Rotation measurement accuracy is primarily determined by a fundamental lock-in threshold associated with coupling of the counter propagating light beams in the ring laser and by the gas flow instability associated with the gas discharge. The lock-in threshold establishes a minimum rotation rate that the sensor can measure and is associated with mirror imperfections and backscattering of the laser light from those imperfections. Photochromic effects where plasma (gas discharge) radiation (ultraviolet light) interacts with the counter propagating laser light beams to form very low level gratings in the mirrors also leads to coupling of the beams and lock-in. The solid state ring laser does not have this latter source of lock-in.

The gas discharge does have properties that lead to instabilities in rotation measurements. Mainly the flowing of the Neon gaseous gain atoms due to the motion of free electrons and ionized particles in the plasma of the gas discharge creates a bias error. This flow is discharge current sensitive, temperature sensitive and magnetic field sensitive. Again the solid state ring laser does not have this error source.

Better performance will lead to more applications for the solid state ring laser sensor.

Alternative applications also become possible because of the design of the solid state ring laser sensor. By eliminating the gas discharge and using a gain mirror it becomes possible to dramatically reduce the size of the ring laser. The gaseous gain medium requires some length to supply the gain necessary to assure an adequate gain-to-loss ratio for laser oscillation to occur. Also, the electrodes occupy significant space on the sides of the ring laser block. Very small ring lasers can be designed for uses not now possible. One such design could use a single block of material to support three orthogonal, very small ring lasers for use in a navigation or guidance system, for example. This would not be possible with gas discharge powered ring lasers because the beam passages (drilled holes) might intersect with one another short circuiting the discharges.

The Nd doped silica thin film gain mirror and pump laser diode assembly shown in FIG. 3 is an entity unto itself. It may be used in conjunction with any ultra low loss laser resonant cavity (ring, linear, out of plane, etc.) for special applications where stability may be paramount and low output power may be tolerated.

Having described the present invention in considerable detail illustrating both a preferred embodiment and alternative embodiments, it should be apparent to those skilled in the art that the invention can be modified in arrangement and detail without departing from the principles of the invention. We claim all modifications coming within the scope and spirit of the claims.

What is claimed is:

1. A gain mirror providing optical amplification for use in ring laser rotation sensors, said ring lasers including at least three mirrors for reflecting counter propagating laser light beams around a closed loop optical path wherein at least one of said mirrors serves, in part, as a gain mirror, the gain mirror ring laser comprising:
   at least three mirrors for reflecting counter propagating laser light beams around a closed loop optical path:
      wherein each of said at least three mirrors comprises:
      a substrate structurally supporting a multilayer dielectric film to form a mirror;
   a mirror having at least two alternating layers of a first and a second dielectric material, said first material having a first index of refraction and said second material having a second index of refraction wherein each of said first and second materials being an odd number of optical quarter wavelengths thick of the laser light propagating around a closed loop optical path;
   wherein at least one of said at least three mirrors serves, in part, as a gain mirror further comprising:
   a single Neodymium (Nd) doped thin film layer of silica (SiO2) deposited on top of said mirror, said single Nd doped thin film layer of silica being an integer number of optical quarter wavelengths thick of the laser light to be amplified in a closed loop optical path, wherein at least one of said first and second dielectric materials comprises said Nd dopant;
   a pump laser diode light source and a focusing optical system for illuminating said single Nd doped thin film with pump light, said pump light having the wavelength and intensity needed to create a population inversion in said Nd dopant in order to provide optical amplification.

2. The gain mirror ring laser of claim 1 wherein said at least three mirrors comprise a first material of TiO2 and a second material of SiO2.

3. The gain mirror ring laser of claim 1 wherein said single Neodymium (Nd) doped thin film top layer comprises SiO2 doped with the ratio of Nd isotopes needed to create continuous counter propagating laser light beams in a closed loop optical path.

4. The gain mirror ring laser of claim 1 wherein said single doped thin film top layer comprises SiO2 doped with the ratio of alternative dopant material isotopes having alternative energy levels needed to create continuous counter propagating laser light beams of alternative wavelength in a closed loop optical path.

5. The gain mirror ring laser of claim 1 wherein said single doped thin film top layer comprises an alternative host material doped with the ratio of dopant material isotopes needed to assure continuous counter propagating laser light beams of the desired wavelength in a closed loop optical path.

6. The gain mirror ring laser of claim 1 wherein at least one of said first and second materials comprises an alternative dopant material having alternative energy levels in order to amplify laser light of different wavelength.

7. The gain mirror ring laser of claim 1 comprising a pump laser diode light source emitting light of an alternative wavelength in order to excite different energy levels in said alternative dopant material thereby creating alternative frequency laser light beams counter propagating around a closed loop optical path.

8. The gain mirror ring laser of claim 1 wherein said focusing optical system comprises a lens and a fiber optic conductor.

9. A solid state ring laser rotation sensor comprising:
   an ultrastable block of material;
   a set of at least three high reflectivity mirrors attached to said block in such a way as to form a closed loop optical path, at least one of said a set of at least three high reflectivity mirrors being a gain mirror;
   the gain mirror oriented to face the interior of the closed loop optical path;
   wherein each of said a set of at least three high reflectivity mirrors comprises:
   a substrate structurally supporting a multilayer dielectric film to form a mirror;
   a mirror having at least two alternating layers of a first and a second dielectric material, said first material having a first index of refraction and said second material having a second index of refraction wherein each of said first and second materials being an odd number of optical quarter wavelengths thick of the laser light propagating around a closed loop optical path;
   wherein at least one of said a set of at least three high reflectivity mirrors further comprises;
   a single Neodymium doped thin film top layer of silica deposited on top of said mirror, said single Nd doped thin film layer of silica being an integer number of quarter optical wavelengths thick of the light to be amplified in a closed loop optical path, wherein at least one of said first and second dielectric materials comprises said dopant;

a pump laser diode light source and a focusing optical system for illuminating and pumping said Nd doped thin film with a pump light, said pump light having the wavelength and intensity needed to create a population inversion in said Nd dopant in order to provide optical amplification.

10. The solid state ring laser rotation sensor of claim 9 wherein said a set of at least three high reflectivity mirrors comprise a first material of TiO2 and a second material of SiO2.

11. The solid state ring laser rotation sensor of claim 9 wherein said single doped thin film top layer comprises SiO2 doped with the ratio of Nd isotopes needed to create continuous counter propagating laser beams in a closed loop optical path.

12. The solid state ring laser rotation sensor of claim 9 wherein said single doped thin film top layer comprises SiO2 doped with the ratio of alternative dopant material isotopes having alternative energy levels needed to create continuous counter propagating laser beams of alternative wavelength in a closed loop optical path.

13. The solid state ring laser of claim 9 wherein said single doped thin film top layer comprises an alternative host material doped with the ratio of dopant material isotopes needed to create continuous counter propagating laser beams of the desired wavelength in a closed loop optical path.

14. The solid state ring laser rotation sensor of claim 9 wherein at least one of said first and second materials comprises an alternative dopant material having alternative energy levels in order to amplify light of different wavelength.

15. The solid state ring laser rotation sensor of claim 9 comprising a pump laser diode light source emitting light of an alternative wavelength in order to excite different energy levels in said alternative dopant material thereby creating alternative frequency laser beams counter propagating around a closed loop optical path.

16. The solid state ring laser rotation sensor of claim 9 wherein said focusing optical system comprises a lens and a fiber optic conductor.

* * * * *